United States Patent
Kim

(10) Patent No.: US 10,564,786 B2
(45) Date of Patent: Feb. 18, 2020

(54) TOUCH DISPLAY DEVICE

(71) Applicant: LG Display Co., Ltd., Seoul (KR)

(72) Inventor: YuHoon Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/032,114

(22) Filed: Jul. 11, 2018

(65) Prior Publication Data

US 2019/0018519 A1 Jan. 17, 2019

(30) Foreign Application Priority Data

Jul. 11, 2017 (KR) .................. 10-2017-0087882

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC .................. G06F 3/044; G06F 3/0412; G06F 2203/04102
See application file for complete search history.

(56) References Cited

U.S. PATENT DOCUMENTS

| | | | |
|---|---|---|---|
| 9,280,247 B2 | 3/2016 | Hashimoto | |
| 9,460,332 B1 | 10/2016 | Bussat | |
| 2006/0146034 A1 | 7/2006 | Chen et al. | |
| 2012/0021244 A1 | 8/2012 | Heikkinen et al. | |
| 2014/0125879 A1* | 5/2014 | Chiu | G02F 1/13338 349/12 |
| 2015/0370363 A1* | 12/2015 | Trend | G06F 3/044 345/174 |
| 2016/0054828 A1* | 2/2016 | Lien | G06F 3/044 345/174 |
| 2016/0202792 A1* | 7/2016 | Han | G06F 3/044 345/174 |
| 2016/0202813 A1 | 7/2016 | Lee et al. | |
| 2017/0139513 A1 | 5/2017 | Hong et al. | |

FOREIGN PATENT DOCUMENTS

| | | |
|---|---|---|
| CN | 102193595 A | 9/2011 |
| JP | 2012-59265 A | 3/2012 |
| JP | 2013-33549 A | 2/2013 |
| KR | 20120052653 A | 5/2012 |

(Continued)

OTHER PUBLICATIONS

Combined Search and Examination Report dated Jan. 11, 2019 issued in the corresponding GB Patent Application No. 1811328.2, pp. 1-7.

(Continued)

*Primary Examiner* — Robert J Michaud
(74) *Attorney, Agent, or Firm* — Polsinelli PC

(57) ABSTRACT

Provided is a touch display device in which the transmittance can be improved. The touch display device includes a touch display panel and a touch driver connected to the touch display panel. The touch display panel includes a touch panel layer including a plurality of touch electrodes and a plurality of touch lines and a driving layer disposed on the touch panel layer and including a plurality of thin film transistors. Thus, the transmittance of the touch display device can be improved.

20 Claims, 9 Drawing Sheets

(56) References Cited

FOREIGN PATENT DOCUMENTS

| KR | 10-2015-0069379 A | 6/2015 |
|----|-------------------|--------|
| TW | 201214236 A | 4/2012 |
| TW | 201610781 A | 3/2016 |

OTHER PUBLICATIONS

Office Action dated Aug. 7, 2019 in co-pending TW Application No. 107123968.
Office Action dated May 20, 2019 with machine translation issued in the corresponding Japanese Patent Application No. 2018-131578, 9 Pages.

* cited by examiner

TOUCH DISPLAY DEVICE

CROSS-REFERENCE TO RELATED APPLICATION

This application claims the priority of Korean Patent Application No. 10-2017-0087882 filed on Jul. 11, 2017, in the Korean Intellectual Property Office, the disclosure of which is incorporated herein by reference in its entirety.

BACKGROUND

Field of the Disclosure

The present disclosure relates to a display device, and more particularly, to a touch display device. Although the present disclosure is suitable for a wide scope of applications, it is particularly suitable for improving transmittance of the touch display device.

Description of the Background

A touch display device is manufactured by installing a touch panel in an image display device such as a liquid crystal display device, a field emission display device, a plasma display panel, and an organic light emitting display device. The touch display device outputs information in response to a user's touch input.

The touch display device can be classified into add-on type, on-cell type, and in-cell type depending on its structure. Particularly, a built-in touch display device uses a common electrode as a touch electrode and thus can be manufactured thin. Further, a touch element is provided within the touch display device, which can thus increase durability. Therefore, built-in touch display devices are being more widely used.

In this case, the touch display device includes a touch element disposed on an upper layer of a touch display panel to improve the touch sensitivity. That is, if the touch display device is an organic light emitting display device, the touch element is disposed on an organic light emitting diode that emits light.

In case where the touch element is disposed on the organic light emitting diode that emits light, even if the touch element is formed of a transparent material, the amount of light transmitted to the outside can be decreased. Thus, the brightness of the touch display device is inevitably decreased.

Further, since the touch element is disposed on the organic light emitting diode, the light emitted from the organic light emitting diode or incident from the outside is uniformly reflected at a specific angle due to a pattern of the touch element. Thus, moire in which a displayed image is distorted can occur in the touch display device.

SUMMARY

Accordingly, the present disclosure is directed to a touch display device with an improved transmittance in which a touch panel layer is disposed under an organic light emitting diode and a driving layer.

Further, the present disclosure is directed to a touch display device with an enhanced bending property. In this touch display device, the number of sub-touch electrodes extended in a bending direction of the touch display device is equal to or less than the number of sub-touch electrodes extended in a direction different from the bending direction of the touch display device.

The present disclosure is not limited to the above-mentioned objects, and other objects, which are not mentioned above, can be clearly understood by those skilled in the art from the following descriptions.

According to an aspect of the present disclosure, there is provided a touch display device. The touch display device includes a touch display panel and a touch driver connected to the touch display panel. The touch display panel includes a touch panel layer including a plurality of touch electrodes and a plurality of touch lines and a driving layer disposed on the touch panel layer and including a plurality of thin film transistors.

According to another aspect of the present disclosure, there is provided a touch display panel for a touch display device comprises a substrate, a touch panel layer disposed on the substrate and including a plurality of touch electrodes and a plurality of touch lines, a driving layer on the touch panel layer and including a plurality of thin film transistors, and a touch driver connected to the plurality of touch electrodes through the plurality of touch lines and sensing a change in a voltage applied to the plurality of touch electrodes to sense a change in capacitance of the plurality of touch electrodes.

According to a further aspect of the present disclosure, there is provided a touch display panel for a touch display device comprises a substrate, a touch panel layer disposed on the substrate and including a plurality of touch electrodes and a plurality of touch lines, wherein each of the plurality of touch electrodes has at least one first sub-touch electrode extended in a first direction and at least one second sub-touch electrode branching off from the first sub-touch electrode and extended in a second direction different from the first direction, a driving layer on the touch panel layer and including a plurality of thin film transistors, and a touch driver connected to the plurality of touch electrodes through the plurality of touch lines and sensing a change in a voltage applied to the plurality of touch electrodes to sense a change in capacitance of the plurality of touch electrodes.

Other detailed matters of the exemplary aspects are included in the detailed description and the drawings.

According to an exemplary aspect of the present disclosure, a touch display device includes a touch panel layer disposed under an organic light emitting diode and a driving layer. Thus, the transmittance of the touch display device can be improved.

Further, according to an exemplary aspect of the present disclosure, the number of first sub-touch electrodes extended in a first direction of the touch display device is equal to or less than the number of second sub-touch electrodes extended in a second direction. Thus, a bending property of the touch display device can be enhanced.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
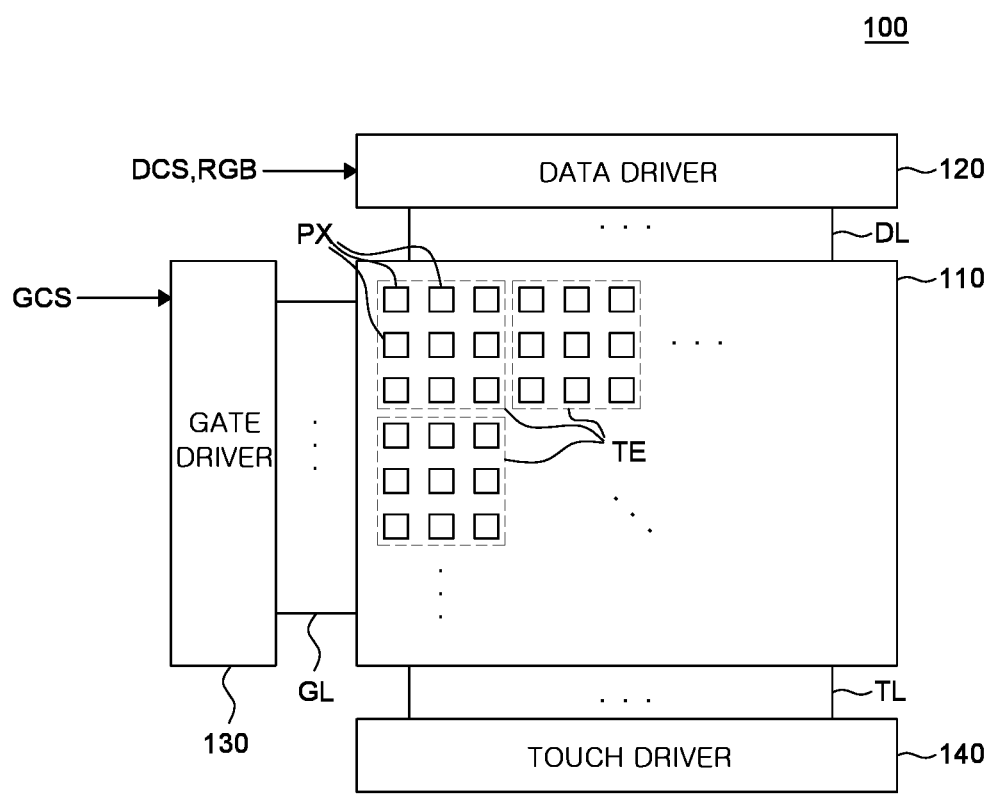
FIG. 1 is a schematic block diagram provided to describe a touch display device according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the exemplary aspect disclosed herein but will be implemented in various forms. The exemplary aspects are provided by way of example only so that a person of ordinary skilled in the art can fully understand the disclosures of the present disclosure and the scope of the present disclosure. Therefore, the present disclosure will be defined only by the scope of the appended claims.

Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

The features of various aspects of the present disclosure can be partially or entirely adhered to or combined with each other and can be interlocked and operated in technically various ways as understood by those skilled in the art, and the aspects can be carried out independently of or in association with each other.

Hereinafter, various exemplary aspects of the present disclosure will be described in detail with reference to accompanying drawings.

FIG. 1 is a schematic block diagram provided to describe a touch display device according to an exemplary aspect of the present disclosure.

Referring to FIG. 1, a touch display device 100 includes a touch display panel 110, a data driver 120, a gate driver 130, and a touch driver 140.

Herein, the touch display panel 110 refers to a panel which can perform a display function outputting an image and a touch function sensing a touch.

The touch display panel 110 includes a substrate formed of glass or plastic and a plurality of gate lines GL and a plurality of data lines DL disposed to intersect with each other on the substrate. A plurality of pixels PX is defined at intersections between the plurality of gate lines GL and the plurality of data lines DL, respectively.

Each of the plurality of pixels PX on the touch display panel 110 includes at least one thin film transistor (TFT).

If the touch display device 100 according to an exemplary aspect of the present disclosure is a liquid crystal display device, a drain electrode is connected to a common electrode and a pixel electrode so as to control a voltage applied to a liquid crystal. Thus, the movement of the liquid crystal can be controlled to implement the gradation of the liquid crystal display device.

Further, if the touch display device 100 according to an exemplary aspect of the present disclosure is an organic light emitting display device, a current is applied to organic light emitting diodes provided in the respective pixels PX. Thus, emitted electrons and holes are combined to form excitons. Then, the excitons emit light to implement the gradation of the organic light emitting display device. Details thereof will be described later with reference to FIG. 2.

However, the touch display device 100 according to an exemplary aspect of the present disclosure is not limited to the liquid crystal display device and the organic light emitting display device and may be any one of various touch display devices.

A plurality of touch electrodes TE is disposed under the pixels PX. Each touch electrode TE may have a size equal to or greater than each pixel PX. As illustrated in FIG. 1, each touch electrode TE may have a size corresponding to an area where nine pixels PX are disposed, but is not limited thereto. Further, each touch electrode TE is connected to the touch driver 140 through a touch line TL.

The gate driver 130 sequentially supplies a gate voltage of an On or Off voltage to the gate lines GL in response to a gate control signal (GCS) supplied from a timing controller.

The gate control signal (GCS) includes a gate start pulse (GSP), a gate shift clock (GSC), a gate output enable (GOE), and the like.

Herein, the gate start pulse (GSP) controls an operation start timing for one or more gate circuits constituting the gate driver 130. The gate shift clock (GSC) is a clock signal commonly input into the one or more gate circuits and controls a shift timing for a scan signal (gate pulse). The gate output enable (GOE) designates timing information of the one or more gate circuits.

The gate driver 130 may be positioned on only one side of the touch display panel 110 or positioned on both sides thereof if necessary, depending on a driving method.

The gate driver 130 may include a shift register, a level shifter, and the like.

The data driver 120 converts image data received from the timing controller into a data voltage Vdata of an analog form on the basis of a data control signal (DCS) and outputs the data voltage Vdata to the data lines DL.

Herein, the data control signal (DCS) includes a source start pulse (SSP), a source sampling clock (SSC), a source output enable (SOE), and the like.

Herein, the source start pulse (SSP) controls a data sampling start timing for one or more data circuits constituting the data driver 120. The source sampling clock (SSC) is a clock signal for controlling a data sampling timing for each data circuit. The source output enable (SOE) controls an output timing for the data driver 120.

The data driver 120 may be connected to a bonding pad of the touch display panel 110 through a tape automated bonding (TAB) method or a chip on glass (COG) method. Otherwise, the data driver 120 may be directly disposed on the touch display panel 110. The data driver 120 may be integrated and disposed in the touch display panel 110 if necessary.

The data driver 120 may include a logic unit including various circuits such as a level shifter and a latch unit, a digital analog converter (DAC), an output buffer, and the like.

Figure 2:
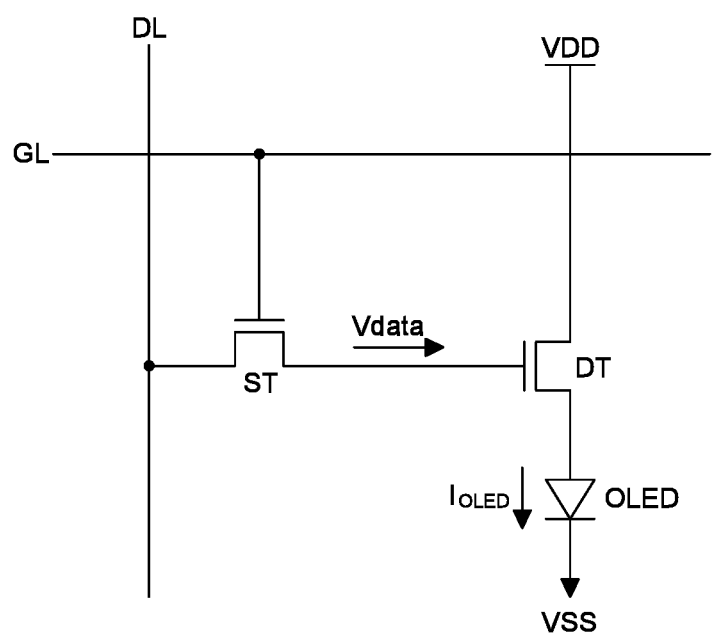
FIG. 2 is a circuit diagram illustrating a circuit disposed on a touch display panel of a touch display device according to an exemplary aspect of the present disclosure.

FIG. 2 is a circuit diagram illustrating a circuit disposed on a touch display panel of a touch display device according to an exemplary aspect of the present disclosure.

Referring to FIG. 2, each pixel PX is driven as follows. First, a switching transistor ST is turned on by a gate voltage supplied to a gate line GL of each pixel PX. Then, a data voltage Vdata is supplied from a data line DL by the turned-on switching transistor ST. A driving transistor DT applied with the data voltage Vdata controls a driving current IOLED. Finally, an organic light emitting diode OLED emits light corresponding to the controlled driving current IOLED to display an image.

The touch driver 140 is connected to the touch electrodes TE through the touch lines TL and configured to determine a touch or non-touch of a user and a touch position. That is, if the user touches a part of the touch display panel 110, the touch driver 140 senses a change in capacitance ΔCs (shown in FIG. 3) of a touch electrode TE disposed in the touched part of the touch display panel 110. Then, the touch driver 140 determines the user's touch or non-touch on the touch display panel 110 and a touch position.

Specifically, the touch driver 140 outputs a sensing voltage in the form of a square wave with a certain level to each of the touch electrodes TE. Then, the voltage applied to the touch electrodes TE for a certain period of time is changed depending on the amount of capacitance of each touch electrode TE. The touch driver 140 senses a change in the voltage applied to the touch electrode TE to sense a change in capacitance ΔCs of a touch electrode TE. Through this process, the touch driver 140 senses a touch on the touch display panel 110. This method of sensing a touch using each touch electrode TE is referred to as a self-capacitive method.

Further, the touch driver 140 is driven for a 1-frame period which is time-divided into a display period for displaying data and a touch period for sensing a touch. Specifically, the touch driver 140 expresses the gradation of each pixel during the display period but does not sense a touch or non-touch on a touch electrode TE. Further, the touch driver 140 fixes the gradation of each pixel during the touch period but senses a touch or non-touch on a touch electrode TE. That is, the touch driver 140 senses a touch or non-touch only during the touch period in the 1-frame period.

Since the touch driver 140 is time-division driven, the touch driver 140 senses a touch or non-touch on the touch display panel 110 only during the touch period in which there is no change in data voltage Vdata and gate voltage applied to the data lines DL and the gate lines GL, respectively. That is, during the touch period, the data voltage Vdata and the gate voltage are fixed and due to a parasitic capacitance generated by the data voltage Vdata and the gate voltage, the change in capacitance ΔCs of the touch electrode TE may not be generated. Therefore, the touch driver 140 can stably sense the change in capacitance ΔCs of the touch electrode TE during the touch period. Thus, the touch sensitivity of the touch display panel 110 can be improved.

Figure 3:
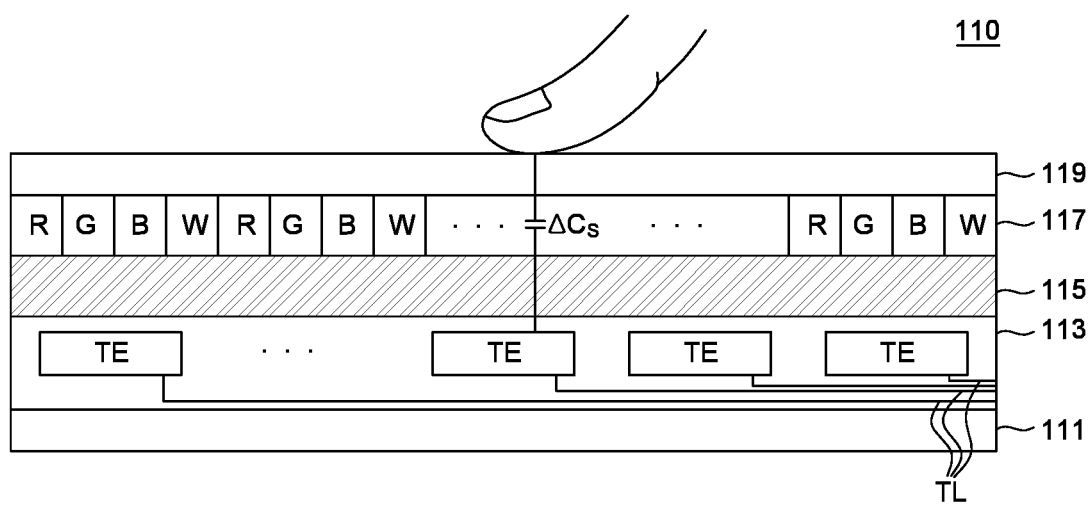
FIG. 3 is a cross-sectional view illustrating a touch display panel of a touch display device according to an exemplary aspect of the present disclosure.
Figure 4:
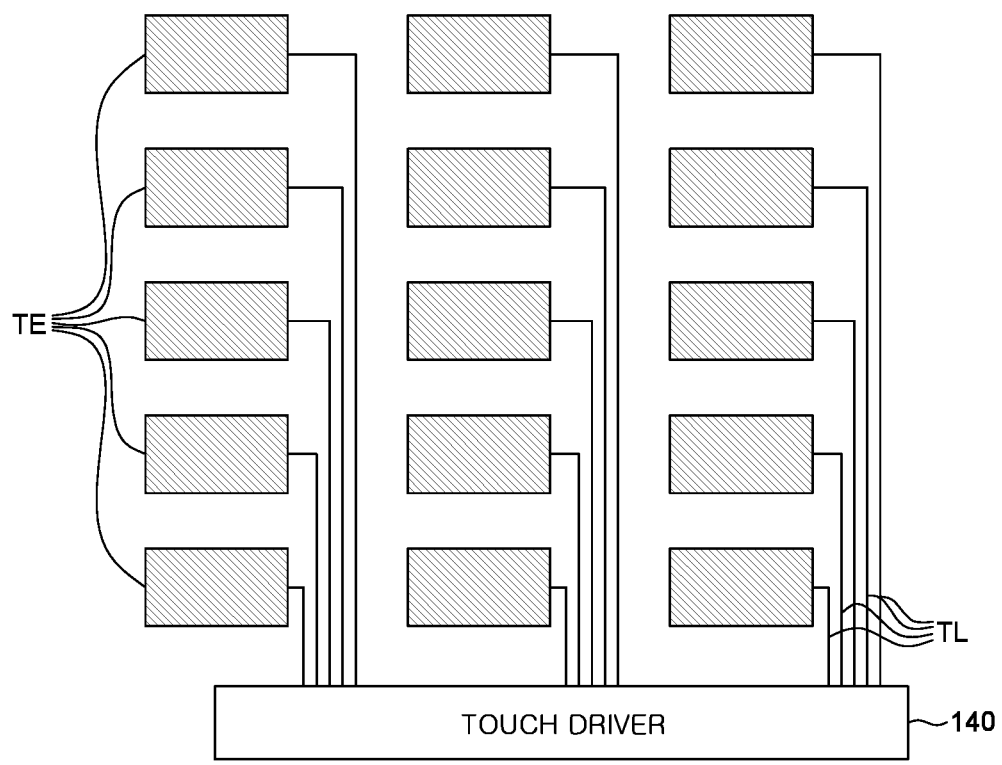
FIG. 4 is a diagram illustrating a touch panel layer and a touch driver of a touch display device according to an exemplary aspect of the present disclosure.

FIG. 3 is a cross-sectional view illustrating a touch display panel of a touch display device according to an exemplary aspect of the present disclosure, and FIG. 4 is a diagram illustrating a touch panel layer and a touch driver of a touch display device according to an exemplary aspect of the present disclosure.

Referring to FIG. 3, the touch display panel 110 includes a substrate 111, a touch panel layer 113, a driving layer 115, an emission unit 117, and a cover layer 119.

The substrate 111 supports the components of the touch display panel 110. The substrate 111 may be formed of a flexible material having an elastic property and thus can be bent by an external force. To this end, the substrate 111 may be formed of plastic, such as polyimide (PI) having a bending property.

The touch panel layer 113 is disposed on the substrate 111. The touch panel layer 113 includes a plurality of touch electrodes TE and a plurality of touch lines TL that connects the plurality of touch electrodes TE to the touch driver 140. Thus, the touch electrodes TE can be connected to the touch driver 140 through the plurality of touch lines TL, respectively. Accordingly, the touch driver 140 can sense a change in capacitance ΔCs of each touch electrode TE, and the touch display panel 110 can sense a touch by the self-capacitive method.

The touch electrodes TE and the touch lines TL may be formed of metal having high electric conductivity. For example, the touch electrodes TE and the touch lines TL may be formed as a single layer or a plurality of layers of aluminum (Al), copper (Cu), molybdenum (Mo), chromium (Cr), gold (Au), titanium (Ti), nickel (Ni), neodymium (Nd), or an alloy thereof. Since the touch electrodes TE and the touch lines TL are formed of metal having high electric conductivity, the touch driver 140 connected to the touch lines TL can rapidly sense the change in capacitance ΔCs of each touch electrode TE. Therefore, a touch response speed of the touch display device 100 can be improved. However, the present disclosure is not limited thereto. The touch electrodes TE and the touch lines TL may be formed of a conductive material instead of metal.

The touch panel layer 113 is disposed under the emission unit 117 and the driving layer 115 to be described later. As such, the touch panel layer 113 is not disposed in front of the emission unit 117 that emits light. Thus, the transmittance of the touch display panel 110 is not decreased. Further, the touch panel layer 113 is disposed behind the emission unit 117 that emits light. Thus, light leaking from the emission unit 117 in a backward direction can be reflected in a forward direction of the touch display panel 110. Therefore, the light efficiency of the touch display device 100 can be improved.

FIG. 4 illustrates that the touch electrodes TE have a square shape, but are not limited thereto and may be formed as various alternative shapes. Details thereof will be described later with reference to FIG. 7 through FIG. 9.

Figure 5:
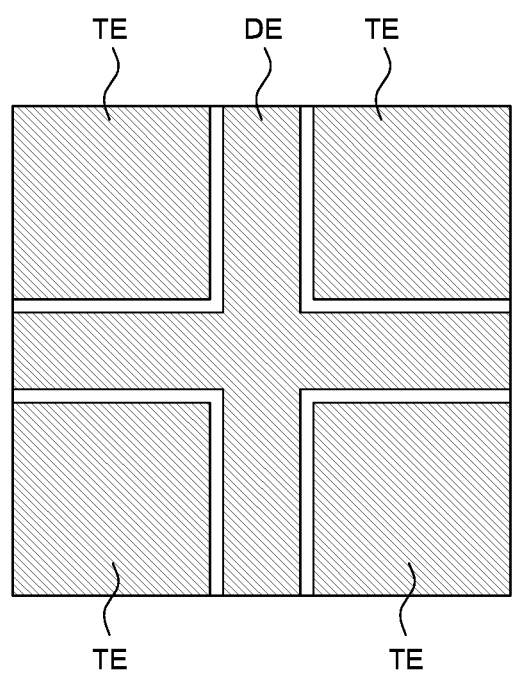
FIG. 5 is a diagram illustrating touch electrodes and a dummy electrode of a touch display device according to an exemplary aspect of the present disclosure.

FIG. 5 is a diagram illustrating touch electrodes and a dummy electrode of a touch display device according to an exemplary aspect of the present disclosure.

Referring to FIG. 5, a dummy electrode DE is disposed in a separation space between a plurality of touch electrodes TE. The dummy electrode DE may be formed of a material having the same reflectivity as the touch electrodes TE. That is, the reflectivity of the dummy electrode DE may be the same as that of the touch electrodes TE. For example, the dummy electrode DE may also be formed as a single layer or a plurality of layers of aluminum (Al), copper (Cu), molybdenum (Mo), chromium (Cr), gold (Au), titanium (Ti), nickel (Ni), neodymium (Nd), or an alloy thereof.

As described above, the dummy electrode DE is formed between the plurality of touch electrodes TE, and, thus, the entire touch panel layer 113 may have substantially the same reflectivity. Therefore, a pattern of the touch electrodes TE cannot be recognized from the outside, and, thus, it is possible to suppress distortion caused by the pattern of the touch electrodes TE.

The driving layer 115 is disposed on the touch panel layer 113, and a plurality of TFTs and data lines DL and gate lines GL connected to the respective TFTs are disposed on the driving layer 115. Further, the driving layer 115 may include a capacitor used to drive an organic light emitting diode OLED.

Specifically, a gate electrode of a TFT is connected to a gate line GL and a source electrode is connected to a data line DL. Further, a drain electrode is electrically connected to each organic light emitting diode OLED disposed in the emission unit 117. However, the present disclosure is not limited thereto. The TFTs, the data lines DL, and the gate lines GL are disposed on the driving layer 115 to drive the organic light emitting diode OLED disposed in the emission unit 117.

The emission unit 117 is disposed on the driving layer 115 and includes a plurality of organic light emitting diodes OLEDs connected to the TFTs.

Specifically, the plurality of organic light emitting diodes OLEDs can implement light of a specific color. For example, the plurality of organic light emitting diodes OLEDs may include a red organic light emitting diode R that implements a red color, a green organic light emitting diode G that implements a green color, a blue organic light emitting diode that implements a blue color, and a white organic light emitting diode W that implements a white color, but is not limited thereto.

The cover layer 119 is disposed on the uppermost layer of the touch display panel 110 and includes an encapsulating layer, a polarizing layer, and a protective layer.

The encapsulating layer is disposed on the emission unit 117 and functions to suppress moisture permeation of an organic light emitting diode OLED.

The encapsulating layer may be formed by alternately laminating an inorganic layer and an organic layer. The inorganic layer formed of an inorganic material may be formed of aluminum (Al)- or silicon (Si)-based carbide compound, nitride compound, and oxide compound. Further, the organic layer formed of an organic material may be formed of an epoxy- or acryl-based polymer.

The polarizing layer may be disposed on the encapsulating layer and suppress image distortion caused by external light reflection. The polarizing layer may include only one polarization axis and polarizes light incident into the touch display panel 110 along the polarization axis. Then, the polarized light is reflected by the driving layer 115 or the touch panel layer 113. Thus, a phase of the polarized light is shifted. Then, the phase-shifted light cannot be transmitted to the outside due to the polarizing layer, and, thus, external light reflection can be suppressed.

The protective layer is disposed on the uppermost layer of the touch display panel 110 and functions to protect the touch display panel 110. To this end, the protective layer may be formed of a material having a high transmittance and a high mechanical strength. Further, as described above, the substrate 111 has flexibility, and, thus, the protective layer may also be formed of a flexible material.

Figure 6:
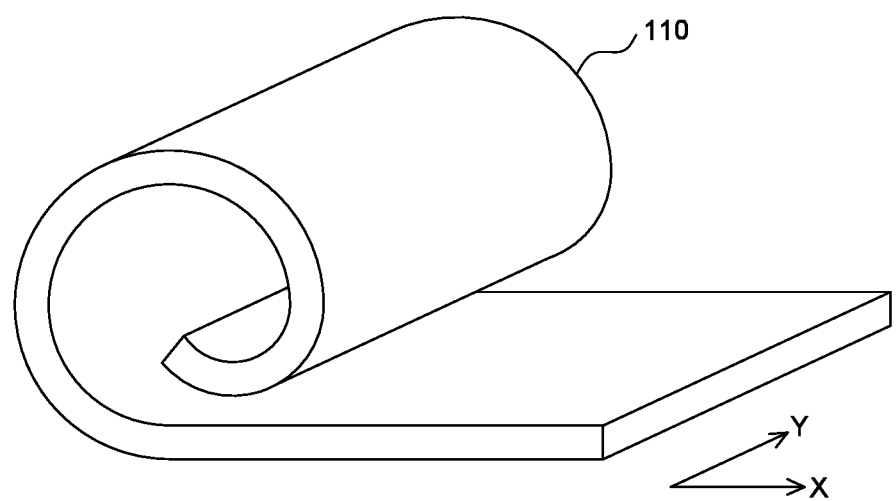
FIG. 6 is a diagram illustrating a bending state of a touch display panel of a touch display device according to an exemplary aspect of the present disclosure.

FIG. 6 is a diagram illustrating a bending state of a touch display panel of a touch display device according to an exemplary aspect of the present disclosure.

As described above, the touch display panel 110 may be bent in a predetermined direction. Herein, when the touch display panel 110 is bent in a predetermined direction, the bending direction may be referred to as a first direction and a direction perpendicular to the first direction may be referred to as a second direction. The second direction is defined as the direction perpendicular to the first direction in FIG. 6, but is not limited thereto. The second direction may be any one of directions different from the first direction. Hereinafter, the first direction will be referred to as an X-direction and the second direction will be referred to as a Y-direction for convenience in explanation.

Figure 7:
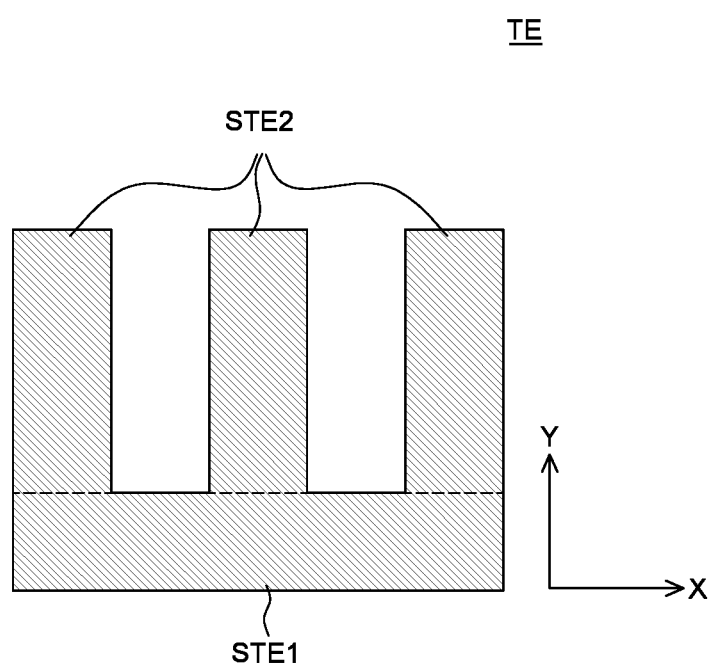
FIG. 7 through FIG. 9 are diagrams each illustrating a touch electrode of a touch display device according to an exemplary aspect of the present disclosure.
Figure 8:
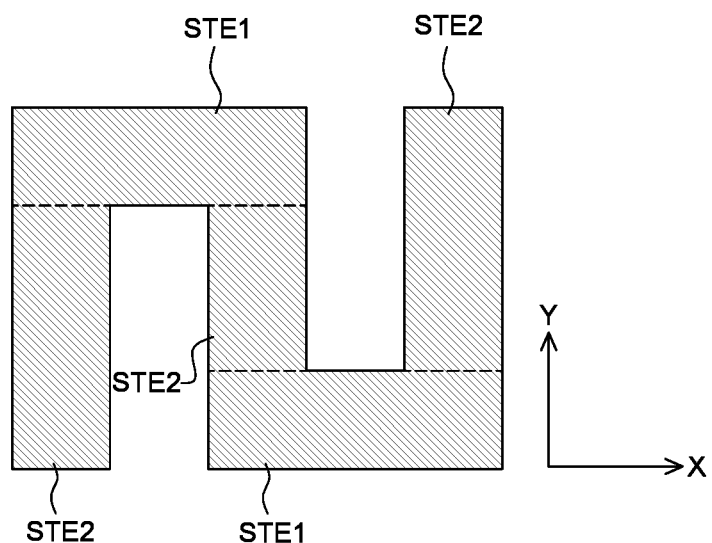
Figure 9:
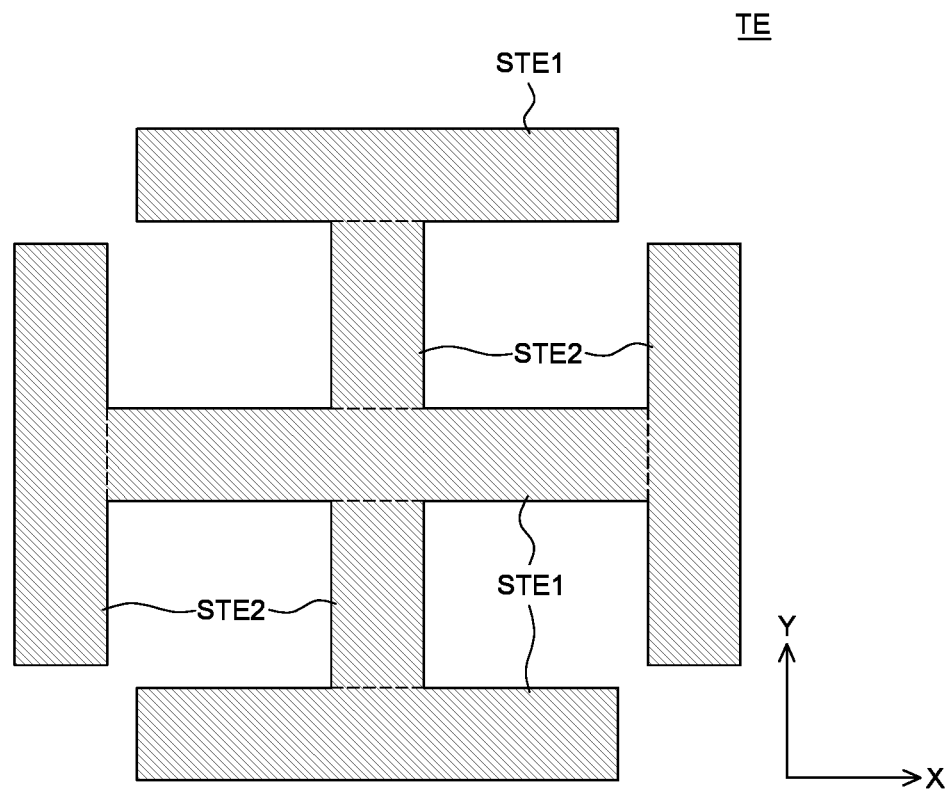

FIG. 7 through FIG. 9 are diagrams each illustrating a touch electrode of a touch display device according to an exemplary aspect of the present disclosure.

A touch electrode TE may include a first sub-touch electrode STE1 extended in the first direction and a second sub-touch electrode STE2 extended in the second direction. Herein, the second sub-touch electrode STE2 branches off from the first sub-touch electrode STE1. Herein, the number of first sub-touch electrodes STE1 is equal to or less than the number of the second sub-touch electrodes STE2.

Referring to FIG. 7, the touch electrode TE may have an "E" shape. That is, the E-shaped touch electrode TE may include a first sub-touch electrode STE1 extended in the first direction and three second sub-touch electrodes STE2 extended in the second direction. Herein, the three second sub-touch electrodes STE2 extended in the second direction are spaced from each other. Thus, separation spaces are formed between the three second sub-touch electrodes STE2 extended in the second direction.

Since the touch electrode TE is formed into the "E" shape, the separation spaces are formed between the second sub-touch electrodes STE2. Due to the separation spaces among the second sub-touch electrodes STE2 extended in the second direction, the touch display panel 110 can be easily bent or rolled in the first direction. That is, a bending property of the touch display device 100 can be enhanced.

Referring to FIG. 8, the touch electrode TE may have a "ㅌ" shape. That is, the ㅌ-shaped touch electrode TE may include two first sub-touch electrodes STE1 extended in the first direction and three second sub-touch electrodes STE2 extended in the second direction. Herein, the three second sub-touch electrodes STE2 extended in the second direction are spaced from each other. Thus, separation spaces are formed between the three second sub-touch electrodes STE2 extended in the second direction.

Since the touch electrode TE is formed into the "ㅌ" shape, the separation spaces are formed among the second sub-touch electrodes STE2. Due to the separation spaces between the second sub-touch electrodes STE2 extended in the second direction, the touch display panel 110 can be easily bent or rolled in the first direction. That is, a bending property of the touch display device 100 can be enhanced.

Referring to FIG. 9, the touch electrode TE may have a symmetrical shape. The touch electrode TE may include three first sub-touch electrodes STE1 extended in the first direction and three second sub-touch electrodes STE2 extended in the second direction. Herein, the three first sub-touch electrodes STE1 extended in the first direction are spaced from each other and the three second sub-touch electrodes STE2 extended in the second direction are also spaced from each other. Thus, separation spaces are formed among the three first sub-touch electrodes STE1 extended in the first direction and separations spaces are also formed among the three second sub-touch electrodes STE2 extended in the second direction.

Further, the middle one of the three first sub-touch electrodes STE1 and the middle one of the three second sub-touch electrodes STE2 may be overlapped in a cross shape. Thus, the touch electrode TE illustrated in FIG. 9 can have a symmetrical shape.

Since the touch electrode TE is formed into the symmetrical shape, the separation spaces are formed between the first sub-touch electrodes STE1 and the separation spaces are formed among the second sub-touch electrodes STE2. Due to the symmetric separation spaces, the touch display panel 110 can be easily bent or rolled in all directions. That is, a bending property of the touch display device 100 can be enhanced.

As described above, a touch display device according to an exemplary aspect of the present disclosure includes a touch panel layer disposed under an organic emission layer and a driving layer. Thus, the transmittance of the touch display device can be improved.

Further, the number of first sub-touch electrodes extended in a first direction of the touch display device according to an exemplary aspect of the present disclosure is equal to or less than the number of second sub-touch electrodes extended in a second direction. Thus, a bending property of the touch display device can be enhanced.

The exemplary aspects of the present disclosure can also be described as follows:

According to an aspect of the present disclosure, a touch display device includes a touch display panel and a touch driver connected to the touch display panel. The touch display panel includes a touch panel layer including a plurality of touch electrodes and a plurality of touch lines and a driving layer disposed on the touch panel layer and including a plurality of thin film transistors.

According to another feature of the present disclosure, the touch display panel may be bent in a first direction. Each of the plurality of touch electrodes includes at least one first sub-touch electrode extended in the first direction and at least one second sub-touch electrode branching off from the first sub-touch electrode and extended in a second direction different from the first direction. The number of the first sub-touch electrodes may be equal to or less than the number of the second sub-touch electrodes.

According to yet another feature of the present disclosure, the touch electrode may have an "E" shape.

According to still another feature of the present disclosure, the touch electrode may have a " " shape.

According to still another feature of the present disclosure, the touch driver may be time-division driven by a display period and a touch period and may sense a touch only during the touch period.

According to still another feature of the present disclosure, the touch display panel may further include at least one dummy electrode disposed between the plurality of touch electrodes.

According to still another feature of the present disclosure, the at least one dummy electrode may have the same reflectivity as the touch electrodes.

According to still another feature of the present disclosure, the touch display panel may further include an organic light emitting diode disposed on the driving layer and connected to the plurality of thin film transistors.

According to still another feature of the present disclosure, the touch display panel may be driven by a self-capacitive method.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A touch display device, comprising:
a touch display panel including a touch panel layer and a driving layer on the touch panel layer, wherein the touch panel layer has a plurality of touch electrodes and a plurality of touch lines, and the driving layer includes a plurality of thin film transistors, and the touch panel layer is disposed under the driving layer; and
a touch driver connected to the touch display panel,
wherein the touch display panel is bendable along a predetermined bending direction, each of the plurality of touch electrodes is separated apart from each other and includes at least one first sub-touch electrode extended along the predetermined bending direction and a plurality of second sub-touch electrode branching off from the at least one first sub-touch electrode and extended along a non-bending direction perpendicular to the predetermined bending direction,
wherein the plurality of second sub-touch electrode is connected through the at least one first sub-touch electrode,
wherein a separation space extended along the non-bending direction and disposed between the plurality of second sub-touch electrode facilitates a bending of the touch display device, and
wherein other plurality of touch electrodes do not exist in the separation space.

2. The touch display device according to claim 1, wherein the number of the first sub-touch electrode is equal to or less than the number of the second sub-touch electrodes.

3. The touch display device according to claim 1, wherein the plurality of touch electrodes has an "E" shape.

4. The touch display device according to claim 1, wherein the plurality of touch electrodes has a " " shape.

5. The touch display device according to claim 1, wherein the touch driver is time-division driven by a display period and a touch period and senses a touch only during the touch period.

6. The touch display device according to claim 1, wherein the touch display panel further comprises at least one dummy electrode disposed between the plurality of touch electrodes.

7. The touch display device according to claim 6, wherein the at least one dummy electrode has a same reflectivity as the touch electrodes.

8. The touch display device according to claim 1, wherein the touch display panel further comprises an organic light emitting diode disposed on the driving layer and connected to the plurality of thin film transistors.

9. The touch display device according to claim 1, wherein the touch display panel is driven by a self-capacitive method.

10. A touch display panel for a touch display device, comprising:
- a substrate;
- a touch panel layer disposed on the substrate and including a plurality of touch electrodes and a plurality of touch lines;
- a driving layer on the touch panel layer and including a plurality of thin film transistors and the touch panel layer is disposed under the driving layer; and
- a touch driver connected to the plurality of touch electrodes through the plurality of touch lines and sensing a change in a voltage applied to the plurality of touch electrodes to sense a change in capacitance of the plurality of touch electrodes,
- wherein the touch display panel is bendable along a predetermined bending direction, each of the plurality of touch electrodes is separated apart from each other and includes at least one first sub-touch electrode extended along the predetermined bending direction and a plurality of second sub-touch electrode branching off from the at least one first sub-touch electrode and extended along a non-bending direction perpendicular to the predetermined bending direction,
- wherein the plurality of second sub-touch electrode is connected through the at least one first sub-touch electrode, and
- wherein a separation space extended along the non-bending direction and disposed between the plurality of second sub-touch electrode facilitates a bending of the touch display device, and
- wherein other plurality of touch electrodes do not exist in the separation space.

11. The touch display device according to claim 10, wherein the number of the first sub-touch electrode is equal to or less than the number of the second sub-touch electrodes.

12. The touch display device according to claim 10, wherein the plurality of touch electrodes has an "E" shape.

13. The touch display device according to claim 10, wherein the plurality of touch electrodes has a " ̅ " shape.

14. The touch display device according to claim 10, wherein the touch driver is time-division driven by a display period and a touch period and senses a touch only during the touch period.

15. The touch display device according to claim 10, wherein the touch display panel further comprises at least one dummy electrode disposed between the plurality of touch electrodes.

16. The touch display device according to claim 15, wherein the at least one dummy electrode has a same reflectivity as the plurality of touch electrodes.

17. A touch display panel for a touch display device, comprising:
- a substrate;
- a touch panel layer disposed on the substrate and including a plurality of touch electrodes and a plurality of touch lines, wherein each of the plurality of touch electrodes has at least one first sub-touch electrode extended along a predetermined bending direction and a plurality of second sub-touch electrode branching off from the first sub-touch electrode and extended along a non-bending direction perpendicular to the predetermined bending direction wherein the plurality of second sub-touch electrode is connected through the at least one first sub-touch electrode; and
- at least one dummy electrode disposed between the plurality of touch electrodes and having a same reflectivity as the plurality of touch electrodes;
- a driving layer on the touch panel layer and including a plurality of thin film transistors and the touch panel layer is disposed under the driving layer; and
- a touch driver connected to the plurality of touch electrodes through the plurality of touch lines and sensing a change in a voltage applied to the plurality of touch electrodes to sense a change in capacitance of the plurality of touch electrodes,
- wherein a separation space extended along the non-bending direction and disposed between the plurality of second sub-touch electrode facilitates a bending of the touch display device, and
- wherein other plurality of touch electrodes do not exist in the separation space.

18. The touch display device according to claim 17, wherein the number of the first sub-touch electrode is equal to or less than the number of the second sub-touch electrodes.

19. The touch display device according to claim 17, wherein the plurality of touch electrodes has an "E" shape.

20. The touch display device according to claim 17, wherein the plurality of touch electrodes has a " ̅ " shape.

* * * * *